2,964,395

METHOD OF IMPROVEMENT OF CALCIUM CYANAMIDE

Albert R. Frank, New York, N.Y., assignor to American Cyanamid Company, New York, N.Y., a corporation of Maine No Drawing. Filed Apr. 19, 1957, Ser. No. 653,743

2 Claims. (Cl. 71—64)

This invention is concerned with the conversion of crude calcium cyanamide into a free-flowing composition particularly suitable for commercial handling and agricultural use. It also contemplates the product so produced.

More specifically, the invention is concerned with a novel method of hydrating the lime content of crude calcium cyanamide. It utilizes therefore, the moisture content of a relatively small proportion of peat moss. The resultant product is markedly improved both in physical characteristics and in suitability for agricultural use.

This invention should not be confused with the old and well known agricultural practice of upgrading mulch. Therein a relatively small amount of hydrated cyanamide is added to a large amount of peat moss or other mulching material. The normal nitrogen content of the moss is low. Cyanamide is added principally to obtain a mixture of increased total nitrogen content. This distinction will be fully brought out in the following amplified description.

As it is usually made, crude calcium cyanamide contains free lime in amounts varying from about 8 to 12 percent, usually about 11 percent. In addition, there is usually some small amount of calcium carbide. Except in air-tight containers, such products cannot be readily stored or shipped because of the tendency of the impurities to absorb atmospheric moisture. This results in both volume increase and gas evolution to sufficient extent to burst the usual shipping bag.

To overcome this undesirable property, it is necessary to convert the crude product into some form that does not readily absorb an excessive content of atmospheric moisture. In the past, this usually has been accomplished by adding sufficient water to substantially complete the hydration before packaging and shipping.

Since this hydrating procedure not only seems simple but economical, it has come to be a commonly accepted practice. Crude cyanamide, usually after milling to the desired particle size, is treated in thin layers with some eleven weight percent or more of water. This produces a temperature increase, usually to about 160°–165° C. At temperatures above about 110° C., about 35 to 40% of the added water usually is lost by evaporation, leaving some 7% combined in the product, thereby providing about the minimum hydration needed in such a process. To insure against excessive swelling during storage, the product is further dried if necessary, usually to about 0.5% H$_2$O or less.

Resultant hydrated material is not free-flowing and usually must then be granulated, or otherwise treated, to produce an optimum particle size for the intended use, particularly when intended for fertilizer. Granulation is usually accomplished by adding more water and milling the mixture prior to final drying. This is a processing cost which it is desired to eliminate and it is an object of this invention to do so. Usually, also, somewhere along the line some two percent of oil is added to the material to prevent excessive dusting.

Unfortunately, hydration directly with water in such manner produces not only a physical dilution of the nitrogen content before drying, but also actual loss in nitrogen. During the reaction some one to two percent of nitrogen always is lost as ammonia. Often, the loss is much greater. Moreover, an appreciable amount of cyanamide is converted to dicyandiamide which is sometimes considered harmful for some agricultural purposes. These losses become exaggerated if the amounts of water used and/or the temperature produced during hydration are allowed to increase. Moreover, even if the residual water content is more than 0.5% there is usually a slow but definite increase in the dicyandiamide content during storage.

It is for this reason that, as noted above, the amount of water used is minimized and that the product is granulated and dried. For these same reasons, many proposals have been made as to methods and means for reducing these losses.

Nevertheless, no such proposed modification of the usual practice briefly outlined above has been found capable of commercial utilization on a general scale or has been widely adopted. The outlined procedure, despite its disadvantages, is the one most commonly found. An improved procedure, therefore, is still desired in the field.

It is, therefore, the principal object of this invention to devise a process which is not subject to these drawbacks. Such a procedure should not involve any special apparatus requirements or excessive handling. The product should be fairly uniform in granular size range, free-flowing, substantially dustless, have a minimum content of dicyandiamide, be storage-stable against excessive swelling or loss in cyanamide nitrogen, and be capable of handling in ordinary shipping bags.

Surprisingly, these objects have been accomplished in a simple, economical manner by using the moisture content of peat moss, on a stoichiometric basis, as water for hydration. The process is both simple and economical and provides an unexpectedly good temperature control. Surprisingly, even when the moisture content of the product is more than 0.5%, it remains free-flowing and surprisingly free from loss of cyanamide nitrogen during storage. Moreover, after adding the conventional antidusting oil, the product is much cleaner and less dusty than the correspondingly-treated conventionally-hydrated product.

For agricultural purposes, the new composition has many advantages. Being a free-flowing powder, it is easily handled and used. Moreover, the presence of the fibrous material improves the soil-conditioning properties. It is not necessary to subject the product to conventional granulation. For purposes other than soil treating, if so desired the free fibrous material can be easily removed by simple screening. When for some particular use a coarser size is wanted, the product can be granulated in the usual way. It is usually desirable to remove at least the larger fibers before granulation.

Peat moss may vary considerably in physical and chemical composition with the differing localities from which it is obtained. It also will be found to vary widely in moisture content. Fortunately, only the latter question is of primary concern in the present invention. The actual water content of the peat moss is easily determined. A sufficient amount of moss is used to supply the requisite water for the hydration.

Peat moss may vary in moisture content from as high as 90–92% or more in freshly dug material to as little as 25–35% after drying. An average moisture content of about 50% is preferred. Commercially, grades containing about 35–55% are readily obtainable. Excellent results can be obtained using these commercially-shipped varieties.

It is an advantage of the present invention that the labor and apparatus requirements are not particularly critical. One operable, but simple procedure is to quickly blend the moss and the cyanamide in a conventional tumbler or blender and then spread the mixture in the open to complete the chemical action. When spread in the open in one-half to three inch layers, reaction is usually complete in about two hours or less. Commercially, spreading thin layers in the open is not usually practical. Alternatively, it may be charged into other suitable storage means which take up less space and require less manual handling.

However, the exothermic heat of and the relatively poor heat transmission of the moss, introduces the necessity for observing certain precautions. The mixture should not be held within the relatively confined blender for sufficient time to produce a temperature rise to above about 80° C. and preferably not above about 60° C. A good average practice is usually from about five to ten minutes.

For the same reasons open storage while the reaction is being completed is desirable. As noted above, in the open in thin layers, the temperature is easily maintained below about 65° C. However, as also noted this is not a practical method for large scale operation. On the other hand, if the mixture is held in 200 pound drums for this period, the temperature may go as high as about 150° C. even though the drums are open. The maximum temperature should not exceed about 100° C. and preferably should be below 80° C. Free access to air or other coolant means is necessary. A number of types of equipment are commercially available employing rotary tumbling or transport on trays or belts through a ventilated space. Such equipment is also available with auxiliary cooling if so desired. When these precautions are observed there is no substantial loss of either total or cyanamide nitrogen.

Enough peat moss should be used to produce a product which does not swell appreciably in storage. Substantially all the moisture content of the peat will be utilized. Ordinarily, only enough moss should be used to provide a slight excess of water over the stoichiometric requirements to hydrate the lime in the crude calcium cyanamide. Adding about 6.5% water or more in this way produces satisfactory products. Adding more than about 10% water in this way tends to favor overheating and also for most purposes an excessive dilution of the nitrogen content. A good general practic is found to be the addition of some 6.5-9% water preferably about 7-8%, as moisture content in peat moss containing some 45-60% moisture. Using peat of 35% moisture, some 18.5 to 25.5% of the mixture will be peat moss and the mixture will range from about 18.5 to about 21% of total nitrogen, or about 18 to about 20.5% cyanamide nitrogen. Using moss of about 55% moisture, these figures will be about 20.2-23% total nitrogen and 20-22.5% cyanamide nitrogen.

The invention will be further illustrated in conjunction with the following examples which are intended as illustrative. Unless otherwise specified, all parts and percentages are by weight. In these examples, the peat moss employed had an average content of free moisture of about 50%; nitrogen about 0.31%; and ash about 0.675%.

EXAMPLE 1

In order to illustrate the hydrating effect of peat moss, portions of crude cyanamide were combined with differing weights of peat moss, tumbled for ten minutes and then spread in an open two inch layer for about two hours. Resultant products were tested for swelling by heating in a moisture chamber at 80° C., for several hours.

*Table I*

| Peat Moss (percent) | Water Added (percent) | Swelling (percent) |
| --- | --- | --- |
| 6 | 3.3 | over 14. |
| 8 | 4.4 | over 14. |
| 10 | 5.5 | over 14. |
| 12 | 6.5 | 8.9. |
| 14 | 7.6 | 3.5. |
| 16 | 8.7 | 1.8. |

EXAMPLE 2

In order to illustrate the low loss of nitrogen which occurs in the process of the present invention, another sample of crude cyanamide was combined with various amounts of peat moss for five minutes in a conical blender and then spread in thin open layers for about two hours. At no time did the temperature exceed about 60° C. Resultant product was oiled (2%) in the conventional way and stored for study. Typical results are shown in Table II.

*Table II*

| Sample | Peat Moss (percent) | Crude Cyanamide (percent) | Total Nitrogen | | Cyanamide Nitrogen | | $H_2O$ (percent) | Ash (percent) |
| --- | --- | --- | --- | --- | --- | --- | --- | --- |
| | | | Percent | Weight * | Percent | Weight * | | |
| 1 | 0 | 100 | 24.55 | 24.55 | 24.14 | 24.1 | 0.46 | 67.59 |
| 2 | 8 | 92 | 22.63 | 24.4 | 22.5 | 24.2 | 4.97 | 62.75 |
| 3 | 16 | 84 | 21.83 | 25.3 | 19.6 | 23.4 | 9.13 | 57.82 |

NOTE: *Weight for samples 2 and 3 as calculated to 100 lbs. crude cyanamide, gain in total N content is due to nitrogen in the moss.

Check analyses made after five months' storage indicated some loss in weight but substantially no change in nitrogen proportions. Removal of fibers from part of the Sample 3 product by screening gave a free-flowing fine powder assaying 23.22% total nitrogen, and 21.96% cyanamide nitrogen. They remained dustless and free flowing during long storage.

EXAMPLE 3

Another sample of crude cyanamide was converted to commercial hydrated grade by combining it with 14% peat moss containing about 54.5% moisture according to the procedure of Example 2. After a 2% conventional oiling, it was screened at 20 mesh (U.S. standard), to remove excess fiber. The minus 20 mesh fraction was granulated in conventional manner by mixing with water in a rotary mixer and drying in a steamjacketed fluidized dryer. Analysis at different stages are shown in the following table.

Table III

| Material | Total Nitrogen | | Cyanamide Nitrogen | | Ash (percent) | H₂O (percent) |
|---|---|---|---|---|---|---|
| | Percent | Weight | Percent | Weight | | |
| Crude cyanamide | 24.9 | 21.4 | 24.4 | 21.0 | 67.5 | 0.30 |
| Whole product | 22.2 | 22.2 | 21.1 | 21.1 | 61.1 | 6.19 |
| +20 mesh | 21.9 | 6.6 | 20.6 | 6.2 | 61.6 | 5.14 |
| −20 mesh | 22.3 | 15.6 | 21.1 | 14.8 | 60.8 | 6.25 |
| Granulated | 22.3 | 14.5 | 20.1 | 13.7 | 62.5 | 4.16 |

The minus 20 mesh fraction remained dust-free and free-flowing even after long storage.

I claim:

1. In hydrating crude calcium cyanamide to obtain a hydrated non-swelling, storage-stable calcium cyanamide product, the improvement which comprises: at ambient temperature forming a substantially uniform admixture of a known weight of said crude cyanamide and a sufficient amount of peat moss of known moisture content to provide, as moisture content of the peat moss, water in an amount of from about 6% to about 9% by weight of said cyanamide, whereby an exothermic reaction is initiated and the temperature of the mixture rises; removing heat from said mixture at a rate such that no portion of said mixture is heated to a temperature above about 100° C., continuing the removal of heat until self-heating substantially ceases and said mixture is cooled to about said ambient temperature, whereby hydration is accomplished with a minimized loss of total and a minimized conversion of cyanamide nitrogen to other forms of nitrogen and a storage-stable calcium cyanamide product is obtained having a total nitrogen content of from about 18.5% to about 23% and a cyanamide nitrogen content of from about 18% to about 22.5%.

2. An improved free-flowing storage stable composition of matter comprising cyanamide containing peat moss in amount of from 11% to about 25% by weight of the mixture, and having a total nitrogen content of from about 18.5% to about 23% and a cyanamide nitrogen content of from about 18% to about 22.5%, said composition being prepared by forming at ambient temperature a substantially uniform admixture of a known weight of said crude cyanamide and a sufficient amount of peat moss of known moisture content to provide, as moisture content of the peat moss, water in an amount of from about 6% to about 9% by weight of said cyanamide, whereby an exothermic reaction is initiated and the temperature of the mixture rises; removing heat from said mixture at a rate such that no portion of said mixture is heated to a temperature above about 100° C.

References Cited in the file of this patent

UNITED STATES PATENTS 1,652,753   Breslayer _____ Dec. 13, 1927

FOREIGN PATENTS 203,683   Great Britain _____ Nov. 22, 1923